(12) United States Patent
Beier et al.

(10) Patent No.: US 11,704,335 B2
(45) Date of Patent: Jul. 18, 2023

(54) DATA SYNCHRONIZATION IN A DATA ANALYSIS SYSTEM

(71) Applicant: International Business Machines Corporation, Armonk, NY (US)

(72) Inventors: Felix Beier, Haigerloch (DE); Dennis Butterstein, Stuttgart (DE); Sabine Perathoner-Tschaffler, Nufringen (DE); Einar Lueck, Filderstadt (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/097,848

(22) Filed: Nov. 13, 2020

(65) Prior Publication Data
US 2022/0156277 A1    May 19, 2022

(51) Int. Cl.
*G06F 16/00* (2019.01)
*G06F 16/27* (2019.01)
*G06F 16/23* (2019.01)

(52) U.S. Cl.
CPC .......... *G06F 16/27* (2019.01); *G06F 16/2386* (2019.01)

(58) Field of Classification Search
CPC .............................. G06F 16/27; G06F 16/2386
See application file for complete search history.

(56) References Cited

U.S. PATENT DOCUMENTS

| | | |
|---|---|---|
| 6,029,178 A | 2/2000 | Martin |
| 8,527,478 B1 | 9/2013 | Goldman |
| 8,996,458 B2 | 3/2015 | Shang |
| 9,442,995 B2 | 9/2016 | Pareek |
| 9,558,211 B1 | 1/2017 | Danaher |
| 9,659,077 B2 | 5/2017 | Chen |
| 10,275,507 B2 | 4/2019 | Hrle |
| 10,540,346 B2 | 1/2020 | Martin |
| 10,657,128 B2 | 5/2020 | Beier |
| 10,698,883 B2 | 6/2020 | Beier |
| 10,706,073 B1 | 7/2020 | Tamkin |
| 10,754,844 B1 | 8/2020 | Jain |
| 10,929,428 B1 * | 2/2021 | Brahmadesam .... G06F 16/2379 |
| 11,397,718 B2 | 7/2022 | Beier |

(Continued)

FOREIGN PATENT DOCUMENTS

| | | |
|---|---|---|
| CN | 106294713 A | 1/2017 |
| CN | 114490677 A | 5/2022 |

(Continued)

OTHER PUBLICATIONS

"dmrefresh—Refresh subscription," IBM, accessed Aug. 25, 2020, 2 pages. <https://www.ibm.com/support/knowledgecenter/en/SSTRGZ_11.4.0/com.ibm.cdcdoc.mysql.doc/refs/dmrefresh.html>.

(Continued)

*Primary Examiner* — Khanh B Pham
(74) *Attorney, Agent, or Firm* — Mark Bergner (57) ABSTRACT

A computer implemented method comprises receiving at least one log record. A type of operation performed in a source database system may be determined based on the log record. Based on the type of operation, an update strategy may be selected from a set of pre-defined update strategies, wherein the update strategy specifies a sequence of replication operations to be performed in order to apply changes described in the at least one log record to a target database system.

18 Claims, 3 Drawing Sheets

(56) References Cited

U.S. PATENT DOCUMENTS

| | | | |
|---|---|---|---|
| 2005/0193024 A1 | 9/2005 | Beyer | |
| 2007/0112882 A1* | 5/2007 | Tysowski | G06F 16/275 |
| 2009/0319550 A1 | 12/2009 | Shau | |
| 2011/0153568 A1* | 6/2011 | Shang | G06F 16/27 |
| | | | 707/648 |
| 2013/0159249 A1 | 6/2013 | Dewall | |
| 2014/0365520 A1 | 12/2014 | Pujare | |
| 2015/0379061 A1 | 12/2015 | Paraschivescu | |
| 2017/0060695 A1* | 3/2017 | Clare | G06F 3/065 |
| 2020/0034365 A1 | 1/2020 | Martin | |

FOREIGN PATENT DOCUMENTS

| | | |
|---|---|---|
| DE | 102021125630 A1 | 5/2022 |
| GB | 2602544 A | 7/2022 |
| JP | 2022078978 A | 5/2022 |

OTHER PUBLICATIONS

Ballard et al., "Smarter Business Dynamic Information with IBM InfoSphere Data Replication CDC," IBM, Mar. 2012, 484 pages. <http://www.redbooks.ibm.com/redbooks/pdfs/sg247941.pdf>.

Beier et al., "Dynamic Selection of Synchronization Update Path," U.S. Appl. No. 17/016,314, filed Sep. 9, 2020.

List of IBM Patents or Patent Applications Treated as Related, Nov. 13, 2020, 2 pages.

Mell et al., "The NIST Definition of Cloud Computing," Recommendations of the National Institute of Standards and Technology, U.S. Department of Commerce, Special Publication 800-145, Sep. 2011, 7 pages.

Saleem, "Cost Optimization for Data Placement Strategies in an Analytical Cloud Service," University of Stuttgart, Oct. 17, 2016, 106 pages. <https://elib.uni-stuttgart.de/bitstream/11682/9824/1/main-report.pdf>.

Stolze et al., "Autonomous Data Ingestion Tuning in Data Warehouse Accelerators," Datenbanksysteme für Business, Technologie und Web (BTW 2017), Mar. 2017, 11 pages, <http://btw2017.informatik.uni-stuttgart.de/slidesandpapers/H2-12-48/paper_web.pdf>.

Stolze et al., "Partial Reload of Incrementally Updated Tables in Analytic Database Accelerators," Datenbanksysteme für Business, Technologie und Web (BTW 2019), Mar. 8, 2019, 11 pages. <https://btw.informatik.uni-rostock.de/download/tagungsband/C7-2.pdf>.

Examination Report dated Jul. 29, 2022 from GB Application No. GB2115084.2 filed Oct. 21, 2021.

* cited by examiner

DATA SYNCHRONIZATION IN A DATA ANALYSIS SYSTEM

BACKGROUND

The present invention relates to the field of digital computer systems, and more specifically, to a method for data synchronization in a data analysis system.

Replication is a process of maintaining a defined set of data in more than one location. It may involve copying designated changes from one source location to a target location, and synchronizing the data in both locations. The source and target can be in logical servers that are on the same machine or on different machines in a distributed network. Several systems exist for moving data from one system to another. However, these systems may need further improvement.

SUMMARY

Various embodiments provide a method for data synchronization in a data analysis system, computer system and computer program product as described by the subject matter of the independent claims. Advantageous embodiments are described in the dependent claims. Embodiments of the present disclosure can be freely combined with each other if they are not mutually exclusive.

In one aspect, a computer implemented method for data synchronization in a data analysis system is provided. The method comprises receiving at least one log record, the log record describing an operation performed in a source database system of the data analysis system; determining based on the log record a type of operation performed in the source database system; and based on the type of operation, selecting an update strategy from a set of pre-defined update strategies, the update strategy specifying a sequence of replication operations to be performed in order to apply changes described in the at least one log record to a target database system of the data analysis system.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enable an optimal usage of multiple update strategies. This may enable saving processing resources because the selection of the update strategy may be based on resource usage performances. The multiple update strategies may be provided depending on the context of the data analysis system. For example, an incremental update replication software/technology of the data analysis system may be upgraded to a completely new technology for performance reasons or because code maintenance expires for the software. This may result in multiple update strategies, namely the first incremental update replication software and a second incremental update replication software which is an upgrade of the first incremental update replication software. However, the first technology may be mature and well-tested while the new technology might have shortcomings in supported data changes that can be replicated. The present subject matter may ensure robustness while the technology transition is applied incrementally in a continuous delivery model by selecting one of the replaced and new technologies. Further, runtime-specific errors may occur that relate to customer-specific system configurations. Such conditions, which would cause a downtime in the replication setup and require manual maintenance windows for correction, may be handled gracefully by the replication system itself, without manual interventions or requiring knowledge about version-specific shortcomings when setting up the replication system, by choosing either the first or the second technology stack.

The data analysis system may, for example, be a data warehousing system or master data management system. The data analysis system may enable data warehousing or master data management or another technique that uses a source and target database systems, wherein the target database system comprises a target database that is configured to receive/comprise a copy of a content of a corresponding source database of the source database system. The source database system may be connected to the target database system via a connection. The connection may, for example, be a TCP/IP connection or another connection enabling the communication of data via the connection between the source database system and the target database system. The source database system may, for example, be a transactional engine and the target database system may be an analytical engine. For example, the source database system may be an online transaction processing (OLTP) system and the target database system may be an online analytical processing (OLAP) system. The source database system may comprise a source dataset and the target database system may comprise a target dataset. The source dataset may be part of a source database and the target dataset may be part of a target database. The source and target datasets may be stored in a same or different format. The formats may differ in encryption, compression, row-oriented vs. column-oriented storage, etc. For example, the source dataset may be stored in a row-oriented format and the target dataset may be stored in a column-oriented format. In other terms, the target dataset may be stored by column rather than by row. The content of the source dataset may be changed by one or more database transactions.

A database transaction may refer to a unit of work performed against a database and treated in a coherent and reliable way independent of other transactions. A database transaction may generally represent any change in a database. For example, a database transaction may be issued to the database system in a language like SQL wrapped in a transaction, using a pattern similar to the following: s1) Begin the transaction, s2) Execute a set of data operations and/or queries, s3) If no errors occur then commit the transaction and end it and s4) If errors occur then roll back the transaction and end it. A transaction commit operation applies all data manipulations within the scope of the transaction and persists the results to the database. The processing step of the database transaction may be the steps s1) and s2) of the pattern, while the application step may be the commit of the transaction so as to end it.

A database may have one or more table spaces and tables with associated indexes. The table space may be a set of volumes on disks that hold the data sets in which tables are actually stored. Every table may be stored in table space. The data operation may be an operation on the database, that is, an operation on the tables or table spaces or indexes. The operations may be of different categories depending on which kind of data the data operation is performed e.g. operations performed on table space level may be of a first category and operations performed on the tables may be of a second category. In addition, each category of operations may comprise one or more types of operations. For example, the second category of operations may comprise a first type of operations such as insert, delete and update operations of the table and a second type of operations that change the structure of the table. Depending on the type of operations, different tools may be used to perform the operations. For example, the data operations may be performed using SQL statements or utilities such as DB2 utilities. Utilities may be used for the operations of the first category and SQL statements may be used for the operations of the second category. Utilities may perform large-scale operations across one or more table spaces. For example, utilities may load thousands or even many millions of rows into a database or reorganize data in a table space. SQL statements may, for example, be used to perform regular operations such as insert, update and delete operations. In addition, the SQL statements may be used to change the structure of a table. The type of operation may, for example, be REGULAR which indicates a normal flow of insert, update, and delete operations, STRUCTURAL_CHANGE which indicates a structural change, UTILITY_ACTION_IN_EXECUTION which indicates a utility action is underway or a UTILITY_ACTION_DONE which indicates that the utility action on table is finished.

Hence, using the same update strategy for the different types of operations may not be optimal as one update strategy may only be performant for certain types of operations but not for others. The present subject matter may solve this issue by selecting the adequate update strategy based on the type of operations. The update strategy may, for example, be one of pre-defined update strategies. The pre-defined update strategies may, for example, comprise a first update strategy using a bulk load and a second update strategy using incremental loads, thus, the first update strategy may be named a bulk-load based update strategy and the second update strategy may be named an incremental load-based update strategy. Each of the first and second update strategies may be implemented in different ways, resulting in different update strategies. The incremental load-based update strategy may enable an incremental load of changes. The incremental load-based update strategy may update only data changed since the previous update. Since fewer rows of data may be copied during each update, the incremental replication may be more efficient than bulk replication. The bulk load-based strategy may load either entire table data or a set of partitions of a table at a given point in time. In one implementation example, the incremental load-based update strategy may replicate logged data changes from INSERT, UPDATE, and DELETE statements on tables. In another implementation example, the incremental load-based update strategy may replicate logged data changes from INSERT, UPDATE, DELETE and ALTER statements on tables.

A log record refers to log information descriptive of a change induced by one or more operations of a database transaction performed on one or more data records of a source table of a database. For example, the log information is provided such that it can be used by the target database system to apply the same change on a target table that corresponds to the source table, e.g., if before applying the change to the source table, both the source and target tables have the same content, the log information may be provided such that the same change can be applied on the target table and the resulting target table has the same content as the changed source table by said change. The log information may, for example, comprise general log attributes and other attributes depending on the type of change associated with the log record. The general log attributes may, for example, comprise a log record sequence number (LRSN) which is a unique ID for a log record indicating the logical order of the change, a timestamp indicating the time at which the log record is created, a transaction ID number which is a reference to the database transaction generating the log record. The other attributes may comprise, for example, for an update change type, a page ID indicating the page ID of the modified page, a length and offset of the page, before and after images which include the value of the bytes of the page before and after the page changes. The page may comprise one or more data records of the database. The before and after images may comprise values of that one or more data records before and after the change is applied respectively. Each data record that is referenced by the log record may be comprised of multiple attributes. Said data record may be uniquely identified, e.g., via an ID attribute, a set of key attributes in the corresponding database table, etc.

According to one embodiment, the at least one log record comprises a sequence of log records pertaining a specific table of the source database system, wherein determining the type of operation is based on this sequence. For example, if the sequence of operations represents a normal flow of insert, update, and delete operations, the type of operation may indicate that is a normal change operation that is performed on the table.

According to one embodiment, the method comprises applying the change described in the at least one log record according to the selected update strategy (primary update strategy). The present subject matter may enable a hybrid database change replication system that uses multiple replication strategies to synchronize data between a source and target system. This may make the same data available in different systems. By making data available on multiple systems, this may facilitate the large-scale sharing of data among systems and distribute the network load among multiple systems.

According to one embodiment, the method comprises detecting that applying the change failed. In response to said detecting, a secondary update strategy may be selected, and the change may be applied based on the secondary update strategy. For example, the secondary update strategy may be a strategy using bulk load. This embodiment may save processing resources that would otherwise be required to first fix the problem of the primary update strategy and using it again after the fix is performed.

In one example, an update strategy such as the primary update strategy may be used as a default update strategy of the data analysis system. For example, the method may comprise after applying the change according to the secondary update strategy, a switch back to the default update strategy may be performed.

According to one embodiment, the type of operation includes at least one of a regular change for adding, deleting or updating records of a table, a structural change for changing the structure of the table, or an activity notification related to a utility action performed on the source database system. The utility action may, for example, be a DB2 utility action such as the following DB2 operations: LOAD, REORG TABLESPACE, DISCARD FROM TABLE etc. The log record provides a means of detecting such a DB2 utility action.

According to one embodiment, the update strategy includes at least one of a regular record add, delete or update operation, a bulk load of the target database system with data originating from the source database system, or a suspension operation for suspending modifications of a certain table of the target database system. The suspension of the modifications of the certain table may, for example, be performed if a utility action is being executed. Once the utility action is done, the bulk load-based update strategy may be selected and applied.

Figure 1:
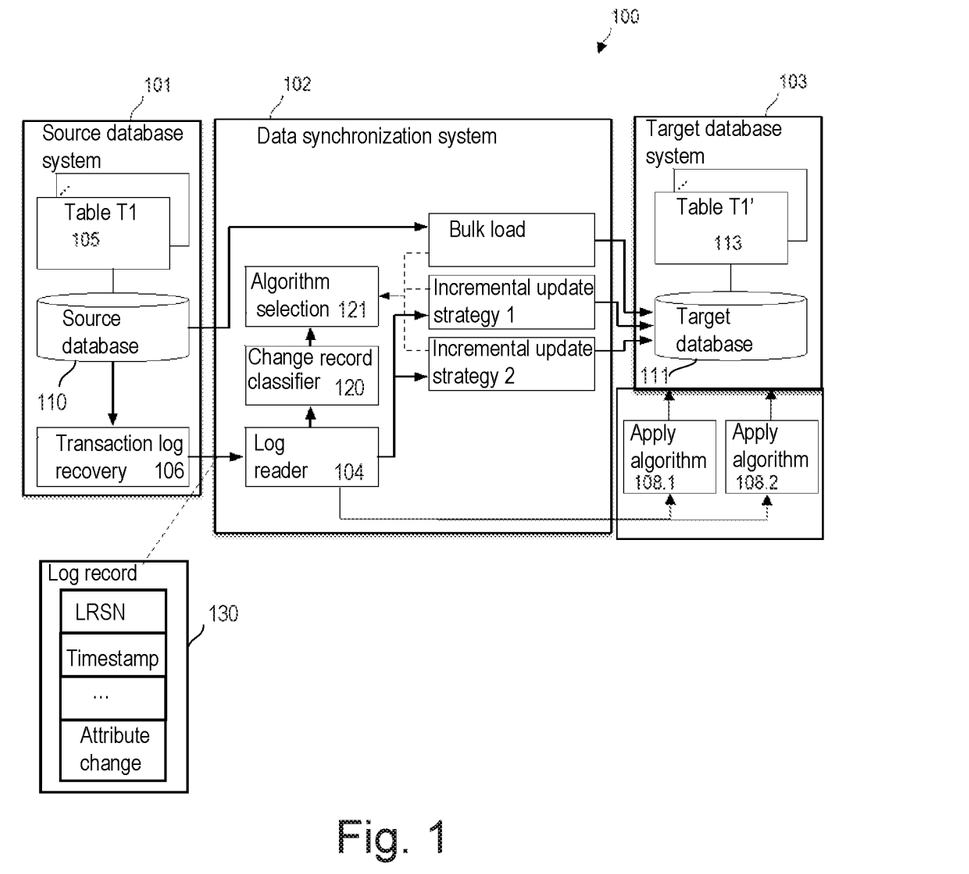
FIG. 1 is a block diagram of a data processing system in accordance with an example of the present subject matter.

FIG. 1 is a block diagram of a data processing system (or data analysis system) 100 in accordance with an example of the present subject matter. The data processing system 100 may be configured for data synchronization between a source database system 101 and target database system 103 using data synchronization system 102 in accordance with an example of the present subject matter. The source database system 101 may, for example, be an online transaction processing (OLTP) system. The target database system 103 may, for example, be an online analytical processing (OLAP) system. The communication between the source database system 101 and the target database system 103 may, for example, be performed via a TCP/IP communication layer.

The source database system 101 comprises one or more source tables 105 of a source database 110 and a transaction recovery log 106. Source tables 105 can be relational tables in DB2® for z/OS®, DB2 for Linux, UNIX, and Windows, and Oracle. The entries or log records of the transaction recovery log 106 describe changes to rows of the source tables 105 at the source database system 101. FIG. 1 shows an example content of a log record 130. The log record 130 may comprise a timestamp, LRSN and attribute changes. More specifically, the log records in the transaction recovery log 106 may, for example, contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, transaction log records for inserted rows may contain only new column values while transaction log records for deleted rows may contain only old column values. Transaction log records for updated rows may contain the new and old values of all row columns. The order of log records in the transaction recovery log may reflect the order of change operations of the transactions and the order of transaction commit records may reflect the order in which transactions are completed. The type of row operations in transaction log records can, for example, be delete, insert or update.

The data synchronization system 102 comprises a log reader 104. The log reader 104 may read log records of the transaction recovery log 106 and provide them to a change record classifier 120. The change record classifier 120 may classify the log records based on their changes so that a selection module 121 may select an update strategy based on the classification of the log records and the update may be performed based on the selected update strategy. The update strategy selection and the change application using said selected strategy may, for example, be performed on a periodic basis, e.g. every hour, or may be performed automatically as soon as a pre-defined amount of log records (e.g. 1000 log records) is saved in the transaction recovery log 106. In each iteration, only the newly added log records with respect to the previous provided log records may be processed. The selected update strategy may, for example, comprise a bulk-load based update strategy or one or more incremental update strategies. The synchronization may be performed differently for the bulk-load based update strategy and the incremental update strategy.

The update using any one of the selected incremental update strategies may be performed using a respective apply algorithm as follows. The log reader 104 may be configured to perform a log shipping of the transaction recovery log 106 to the target database system 103 based on an incremental update strategy that is selected by the selection module 121. The shipping may, for example, be performed by sending a stream of log records formed from log records of the transaction recovery log 106. The log stream being shipped may, for example, be associated with as stream ID. The stream of log records may, for example, be a stream of merged log records. This may enable an efficient processing of the log records at the target database system. The target database system 103 comprises multiple apply programs 108.1 and 108.2 each being associated with a respective incremental update strategy. FIG. 1 shows only two apply algorithms for illustrative purposes but is not limited to only two apply algorithms. The target database system 103 further comprises one or more target table copies 113 of target database 111. The target database system comprises a log streaming interface for receiving the log streams from the source database system 101. Each of the apply programs 108.1 and 108.2 may be configured to receive streams of log records via the log streaming interface. Each of the apply programs 108.1 and 108.2 may buffer the received log records and consolidate the changes into batches to improve efficiency when applying the modifications to the tables 113 of the target database 111 e.g. via a bulk-load interface.

In another example, a bulk load (snapshot updates) may be performed between the source database system 101 and the target database system 103 based on a selected bulk-based update strategy. The load may be a load of entire table data or of a set of partitions of a table at a given point in time and directly performed from the source database system to the target database system. Data on the target database system may reflect the source database system state at the time the load was executed.

Although shown as separate components, the data synchronization system 102 may, in another example, be part of the source database system 101. In one example, the source and target database systems 101 and 103 may be on the same system or on different systems in a distributed network. Additionally, the data synchronization system 102, the source database system 101 and/or the target database system 103 can be implemented as a computer system such as system 600 described below with respect to FIG. 5.

Figure 2:
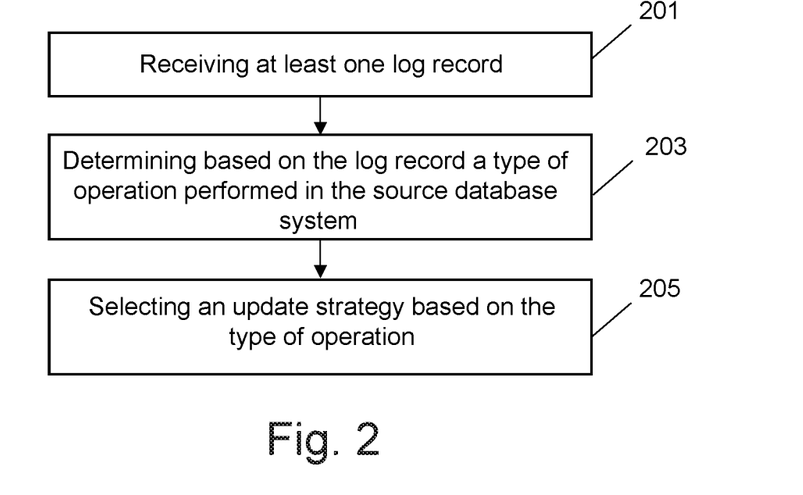
FIG. 2 is a flowchart of a method for enabling application of changes made in a source database system to a target database system in accordance with an example of the present subject matter.

FIG. 2 is a flowchart of a method for applying changes made in a source database system to a target database system in accordance with an example of the present subject matter. For the purpose of explanation, the method described in FIG. 2 may be implemented in the system illustrated in FIG. 1 but is not limited to such an implementation. The method of FIG. 2 may, for example, be performed by the data synchronization system 102.

At least one log record may be received at block 201. The log record describes at least one operation performed in one or more source tables of the source database system 101. The at least one log record may be a record of the transaction recovery log 106. For example, the log reader 104 may read or receive the at least one log record from the source database system 101. In one example, the at least one log record comprises a sequence of log records pertaining a specific table 105 of the source database system 101. The at least one log record may automatically be received e.g. upon it is created in the transaction recovery log 106. In another example, the at least one log record may be received in response to sending a request to the source database system 101.

A type of operation performed in the source database system 101 may be determined at block 203 based on the at least one log record. The type of operation may, for example, be determined using the change record classifier 120. For example, after reading or receiving the at least one log record from the source database system's transaction recovery log 106, the change type may be decoded and classified using the change record classifier 120. The classification of the change type is indicative of the type of operation. The type of operation may, for example, include a regular change for adding, deleting or updating records of a table, a structural change for changing the structure of the table, or an activity notification related to a utility action performed on the source database system. For example, the change record classifier 120 may output several types of operations such as regular attribute value change in source tables 105, structural change of the replicated source tables or utility invocations modifying source tables 105.

Based on the type of operation, an update strategy may be selected at block 205 from a set of pre-defined update strategies. The update strategy specifies a sequence of replication operations to be performed in order to apply changes described in the at least one log record to the target database system 103. For example, a mapping between the types of operations and the update strategies may be provided. The mapping may be used to automatically select the update strategy.

Figure 3:
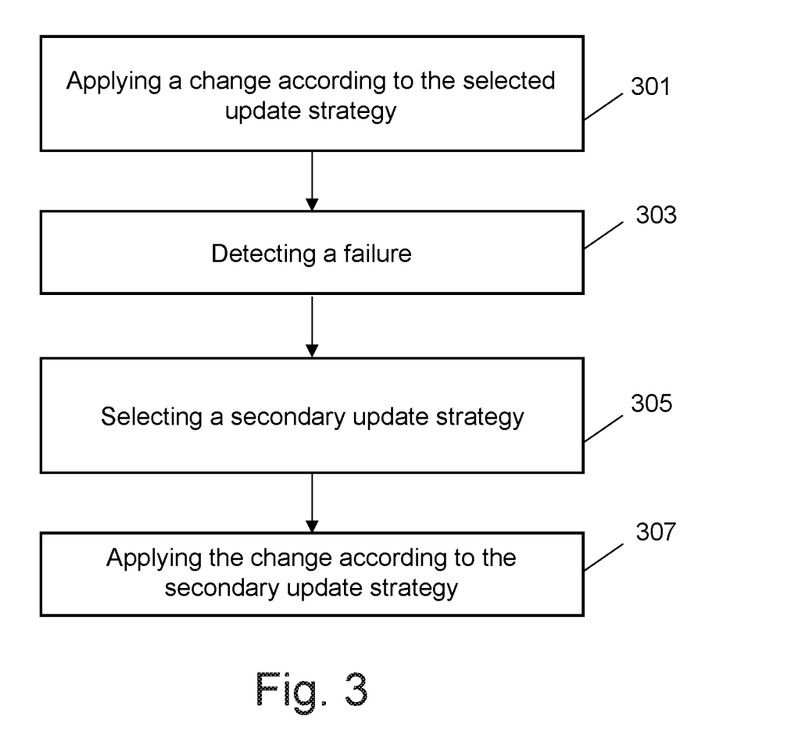
FIG. 3 is a flowchart of a method for applying changes made in a source database system to a target database system in accordance with an example of the present subject matter.

FIG. 3 is a flowchart of a method for applying changes made in a source database system to a target database system in accordance with an example of the present subject matter. For the purpose of explanation, the method described in FIG. 3 may be implemented in the system illustrated in FIG. 1 but is not limited to such an implementation.

The change described in the at least one log record (e.g. processed in the method of FIG. 2) may be applied at block 301 according to the selected update strategy of step 205. A failure in the application of the change may be detected at block 303. For example, the data synchronization system 102 may observe the application of data changes to the target database system by any of the implemented update strategies and may detect unexpected error conditions that prevent applying the replicated data changes by the selected data update strategy. In response to said detecting, a secondary update strategy may be selected at block 305 and the change may be applied at block 307 based on the secondary update strategy. Selecting another update strategy as fallback implementation may enable to automatically recover from these runtime errors without downtimes or user interaction. For example, in case an incremental update strategy fails to apply log records classified as REGULAR operation, the selection module 121 is triggered with a reference to the failed log records. The selection module 121 then selects a different implementation technology (e.g. and corresponding apply algorithm 108.1 or 108.2), loads the implementation and forwards log records to the corresponding implementation. The selection module 121 may be configured to forward log records on a transaction boundary e.g. at the beginning of the transaction. That way, through a rollback of the failed transaction and replay through a different technology, the overall consistency may be guaranteed. When playing a transaction via a first strategy fails, the operations performed so far may have to be undone and a secondary strategy can be used to retry all of the operations.

Figure 4:
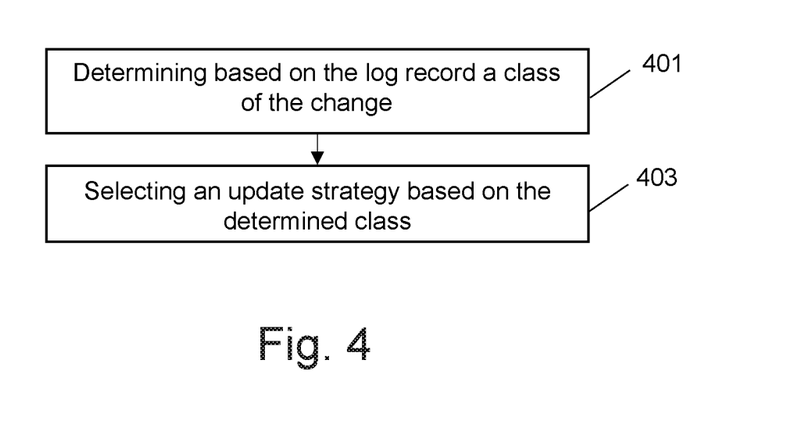
FIG. 4 is a flowchart of a method for applying changes made in a source database system to a target database system in accordance with an example of the present subject matter.

FIG. 4 is a flowchart of a method for applying changes made in a source database system to a target database system in accordance with an example of the present subject matter. For the purpose of explanation, the method described in FIG. 4 may be implemented in the system illustrated in FIG. 1 but is not limited to this implementation. The method of FIG. 4 may, for example, be performed by the data synchronization system 102.

The change record classifier 120 may decide at block 401, based on a sequence of one or more log records for a table, to which class of pre-defined classes belong the inflowing changes. For example, the following classes may be defined: REGULAR class which indicates a normal flow of insert, update, and delete operations, STRUCTURAL_CHANGE class which indicates a structural change (the structural change may for example be apparent if changes are caused by the statement ALTER TABLE and the changes have to be committed), UTILITY_ACTION_IN_EXECUTION class indicates a utility action is underway and a UTILITY_ACTION_DONE class indicates that the utility action on table is finished. The classification may be done based on the parsing result/decomposition of the particular log record.

The change categories are used at block 403 by the selection module 121 to dynamically switch between the available data replication strategies. For example, for each table, the selection module 121 may select the update strategy based on the class determined at block 401. If the class is REGULAR, the actual selection may be done based on performance metrics. For example, if the number of regular operations is higher than a threshold, a bulk load may be chosen; otherwise an incremental load may be used. In case of STRUCTURAL_CHANGE classification, a bulk load is triggered immediately. In case UTILITY_ACTION_IN_EXECUTION is seen, the table is temporarily suspended from the synchronization process. Thus, changes are not actively applied anymore. A bulk load is then triggered when UTILITY_ACTION_DONE is seen. Thus, the selection module 121 may select a bulk load strategy in case the change record encodes a change that may not be incrementally applied from source tables 105 to target tables 113 in order to synchronize the source tables' snapshot. After synchronizing the tables with a bulk load strategy, the system may switch back to an incremental load-based update strategy, using the timestamp of the last committed transaction in the previously synchronized table snapshot to resume processing.

Figure 5:
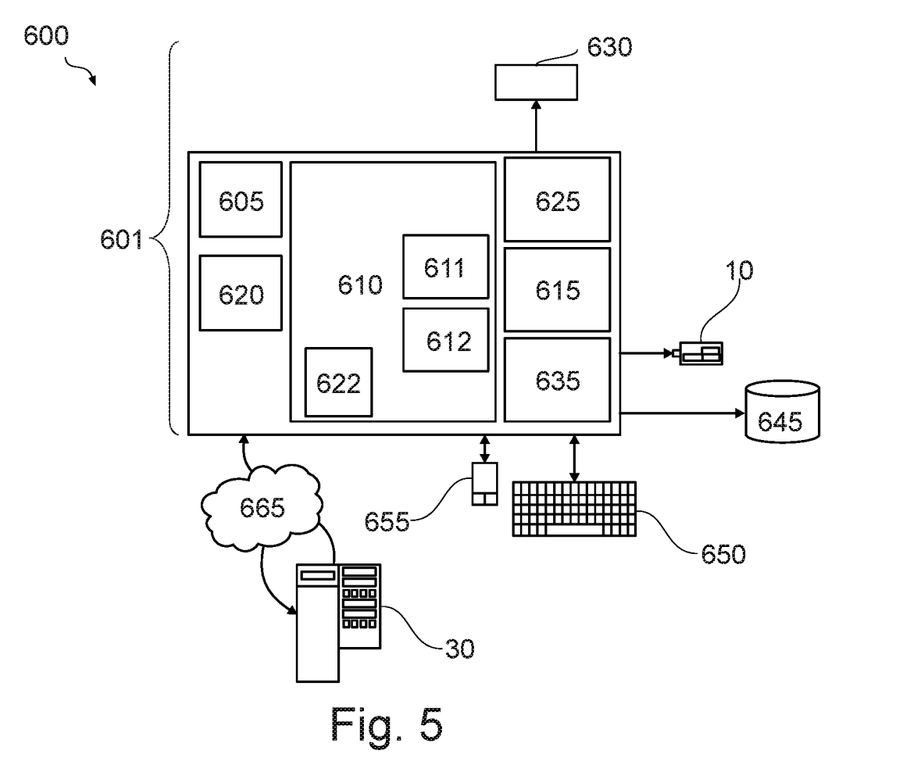
FIG. 5 represents one embodiment of an example computer system.

FIG. 5 represents a computer system 600 suited for implementing at least one or more functions of the methods described above with respect to FIG. 2, FIG. 3, and/or FIG. 4.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The system 600 includes a general-purpose computer 601.

In exemplary embodiments, in terms of hardware architecture, as shown in FIG. 5, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments described herein. In the example of FIG. 5, software in the memory 610 includes instructions 612 e.g. instructions to manage databases such as a database management system.

The software in memory 610 also typically includes a suitable operating system (OS) 611. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the functions of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, are read by the processor 605, possibly buffered within the processor 605, and then executed.

When the systems and methods described herein are implemented in software 612, as is shown in FIG. 5, the methods can be stored on any computer readable medium, such as storage 620, for use by or in connection with any computer related system or method. The storage 620 may comprise a disk storage such as HDD storage.

The present subject matter may comprise the following clauses

Clause 1: A computer implemented method for data synchronization in a data analysis system, the method comprising receiving at least one log record, the log record describing an operation performed in a source database system of the data analysis system;

determining based on the log record a type of operation performed in the source database system; and based on the type of operation, selecting an update strategy from a set of pre-defined update strategies, the update strategy specifying a sequence of replication operations to be performed in order to apply changes described in the at least one log record to a target database system of the data analysis system.

Clause 2: The method of clause 1, wherein the at least one log record comprises a sequence of log records pertaining a specific table of the source database system, determining the type of operation being based on the sequence.

Clause 3: The method of clause 1 or 2, wherein determining the type of the operation comprises comparing the number of operations indicated in the at least one log record with a pre-defined threshold, and based on the comparison result determining the type of operation.

Clause 4: The method of any of the preceding clauses 1-3, wherein the method comprises applying the change described in the at least one log record according to the selected update strategy.

Clause 5: The method of clause 4, wherein the method comprises detecting that applying the change failed; in response to said detecting, selecting a secondary update strategy; and applying the change based on the secondary update strategy.

Clause 6: The method of any of the preceding clauses 1-5, wherein the type of operation includes at least one of a regular change for adding, deleting or updating records of a table, a structural change for changing the structure of the table, or a utility action performed on the source database system.

Clause 7: The method any of the preceding clauses 1-6, wherein the update strategy uses at least one of a regular record add, delete or update operation, a bulk load of the target database system with data originating from the source database system, or a suspension operation for suspending modifications of a certain table of the target database system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for data synchronization in a data analysis system, the method comprising
receiving at least one log record, the log record describing an operation performed in a source database system of the data analysis system;
determining, based on the log record, a type of operation performed in the source database system;
based on the type of operation, selecting an update strategy from a set of pre-defined update strategies, the update strategy specifying a sequence of replication operations to be performed in order to apply changes described in the at least one log record to a target database system of the data analysis system; and
determining a class of a change record of the log record, wherein the class is determinable as being a regular class, a structural change class, and a utility action class;
wherein the update strategy uses:
a regular record add, delete, or update operation for the class determined to be a regular class;
a bulk load of the target database system with data originating from the source database system for the class determined to be a structural change class; and
a suspension operation for suspending modifications of a certain table of the target database system for the class determined to be a utility action class.

2. The method of claim 1, wherein the at least one log record comprises a sequence of log records pertaining a specific table of the source database system, determining the type of operation being based on the sequence.

3. The method of claim 1, wherein determining the type of the operation comprises comparing the number of operations indicated in the at least one log record with a pre-defined threshold and, based on the comparison result, determining the type of operation.

4. The method of claim 1, wherein the method comprises applying the change described in the at least one log record according to the selected update strategy.

5. The method of claim 4, wherein the method comprises:
detecting that applying the change failed;
in response to said detecting, selecting a secondary update strategy; and
applying the change based on the secondary update strategy.

6. The method of claim 1, wherein the type of operation includes at least one of a regular change for adding, deleting or updating records of a table, a structural change for changing the structure of the table, or a utility action performed on the source database system.

7. A computer program product comprising a computer-readable storage medium having computer-readable program code embodied therewith, the computer-readable program code configured to cause a processor to:
receive at least one log record, the log record describing an operation performed in a source database system of the data analysis system;
determine, based on the log record, a type of operation performed in the source database system;
based on the type of operation, select an update strategy from a set of pre-defined update strategies, the update strategy specifying a sequence of replication operations to be performed in order to apply changes described in the at least one log record to a target database system of the data analysis system; and
determine a class of a change record of the log record, wherein the class is determinable as being a regular class, a structural change class, and a utility action class;
wherein the update strategy uses:
a regular record add, delete, or update operation for the class determined to be a regular class;
a bulk load of the target database system with data originating from the source database system for the class determined to be a structural change class; and
a suspension operation for suspending modifications of a certain table of the target database system for the class determined to be a utility action class.

8. The computer program product of claim 7, wherein the at least one log record comprises a sequence of log records pertaining a specific table of the source database system, determining the type of operation being based on the sequence.

9. The computer program product of claim 7, wherein the computer-readable program code is configured to cause a processor to determine the type of the operation by comparing the number of operations indicated in the at least one log record with a pre-defined threshold and, based on the comparison result, determining the type of operation.

10. The computer program product of claim 7, wherein the computer-readable program code is further configured to cause the processor to apply the change described in the at least one log record according to the selected update strategy.

11. The computer program product of claim 10, wherein computer-readable program code is further configured to cause the processor to:
  detect that applying the change failed;
  in response to said detecting, select a secondary update strategy; and
  apply the change based on the secondary update strategy.

12. The computer program product of claim 7, wherein the type of operation includes at least one of a regular change for adding, deleting or updating records of a table, a structural change for changing the structure of the table, or a utility action performed on the source database system.

13. A computer system comprising:
  a memory configured to store executable instructions; and
  a processor communicatively coupled to the memory and configured to execute the executable instructions to:
  receive at least one log record, the log record describing an operation performed in a source database system;
  determine based on the log record a type of operation performed in the source database system;
  based on the type of operation, selecting an update strategy from a set of pre-defined update strategies, the update strategy specifying a sequence of replication operations to be performed in order to apply changes described in the at least one log record to a target database system; and
  determine a class of a change record of the log record, wherein the class is determinable as being a regular class, a structural change class, and a utility action class;

wherein the update strategy uses:
  a regular record add, delete, or update operation for the class determined to be a regular class;
  a bulk load of the target database system with data originating from the source database system for the class determined to be a structural change class; and
  a suspension operation for suspending modifications of a certain table of the target database system for the class determined to be a utility action class.

14. The computer system of claim 13, wherein the at least one log record comprises a sequence of log records pertaining a specific table of the source database system, determining the type of operation being based on the sequence.

15. The computer system of claim 13, wherein the processor is configured to determine the type of the operation by comparing the number of operations indicated in the at least one log record with a pre-defined threshold and, based on the comparison result, determining the type of operation.

16. The computer system of claim 13, wherein the processor is configured to apply the change described in the at least one log record according to the selected update strategy.

17. The computer system of claim 16, wherein the processor is further configured to:
  detect that applying the change failed;
  in response to said detecting, select a secondary update strategy; and
  apply the change based on the secondary update strategy.

18. The computer system of claim 13, wherein the type of operation includes at least one of a regular change for adding, deleting or updating records of a table, a structural change for changing the structure of the table, or a utility action performed on the source database system.

* * * * *